June 12, 1945.  A. R. LEE  2,378,227

RATE OF CLIMB INDICATOR

Filed Nov. 20, 1943

INVENTOR.
ASA REN LEE
BY
Kwis Hudson Boughton & Williams
ATTORNEYS

Patented June 12, 1945

2,378,227

UNITED STATES PATENT OFFICE 2,378,227

RATE-OF-CLIMB INDICATOR

Asa Ren Lee, Cleveland, Ohio, assignor to Designers For Industry, Inc., Cleveland, Ohio, a corporation of Ohio Application November 20, 1943, Serial No. 511,168

7 Claims. (Cl. 73—179)

This invention relates to indicating instruments and aims to provide a novel form of instrument by which indications will be directly given of the rate at which pressure changes are taking place in a fluid.

Another object of my invention is to provide a novel indicating instrument for use as a rate of climb indicator for aircraft.

A further object of my invention is to provide a novel rate of climb indicator or the like embodying a meter and a plurality of electron tubes, and wherein the combined effect produced by such electron tubes is used to control or actuate the meter.

Still another object of my invention is to provide a novel indicating apparatus of the character mentioned embodying a meter and a plurality of electron tubes for controlling or energizing such meter in response to pressure changes in a fluid, and wherein the effect of the pressure changes on one of the electron tubes is retarded relative to the effect produced on the other electron tube.

Figure 1:
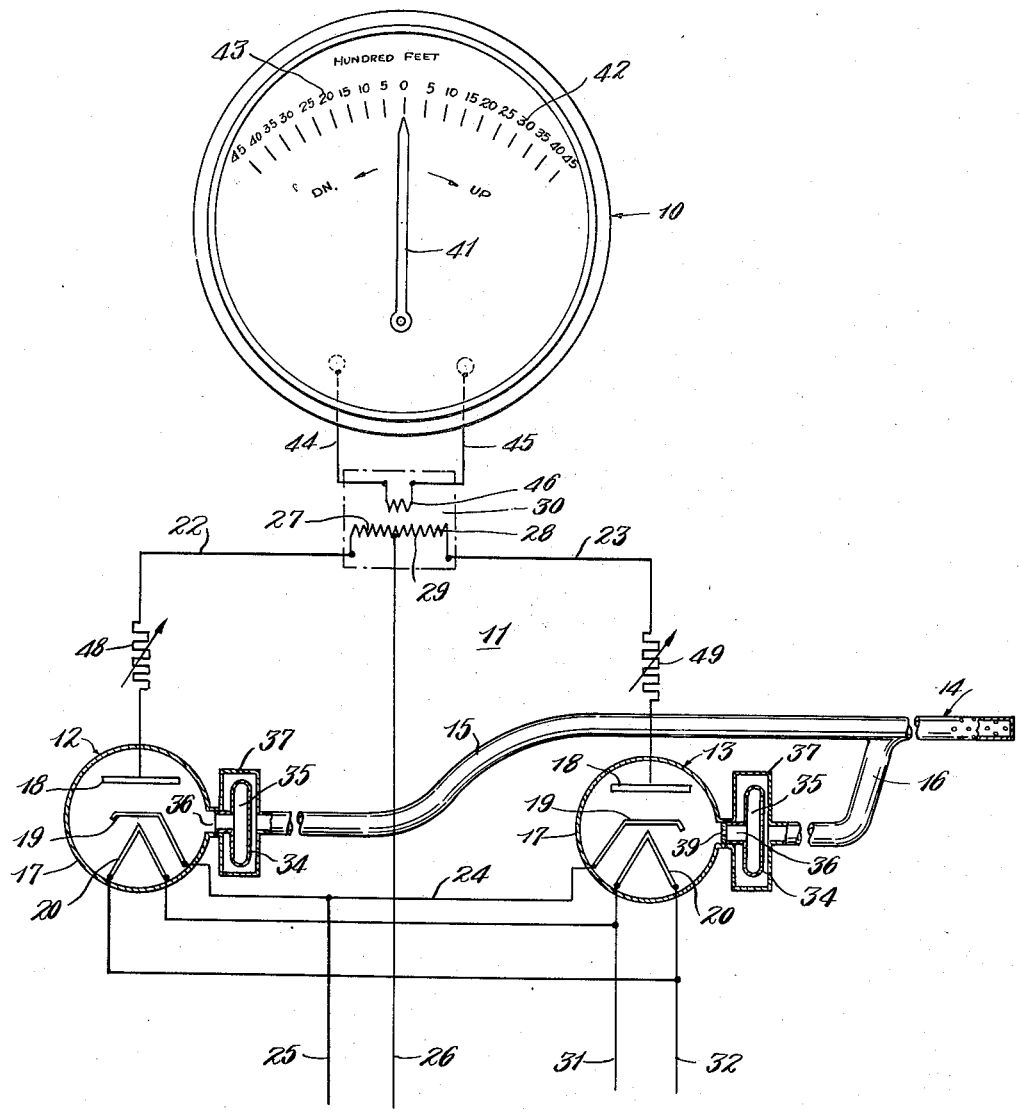
Figure 2:
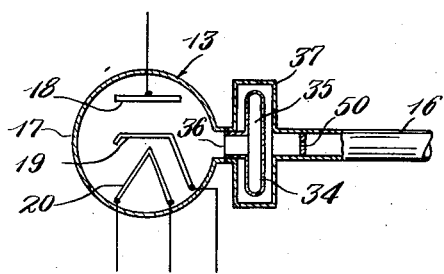

Other objects and advantages of this invention will be apparent from the following description when taken in conjunction with the accompanying sheet of drawings in which:

Fig. 1 is a diagram showing an indicating instrument embodying my invention, and Fig. 2 is a diagrammatic view showing a modification of my indicating instrument.

My novel indicating instrument is applicable to various uses where it is desirable to obtain indications of the rate at which a change is taking place in the pressure of a fluid, but is especially useful as a rate of climb indicator for aircraft. As shown in Fig. 1 of the drawing, the instrument comprises in general a meter 10 and an electron tube apparatus 11 for actuating or controlling such meter. The apparatus 11 preferably embodies a pair of electron tubes 12 and 13 which are connected with the static tube 14 of the aircraft by conduits 15 and 16. As will be explained more in detail hereinafter, the electron tubes 12 and 13 respond to changes in atmospheric pressure in such a manner that their combined or differential effect can be used to actuate or control the meter 10. The static tube 14 as presented in the drawing is of a conventional form used on aircraft.

The electron tubes 12 and 13 are substantially identical in form and each comprises a sealed envelope or casing 17 containing a plate 18, a cathode 19, and a heater 20 for heating the cathode. In constructing the electron tubes 12 and 13 the casing 17 is initially evacuated and a small quantity of a suitable gas, such as neon gas, is introduced into the tube and sealed therein, so that heating of the cathode by the heater 20 will result in a flow of electrons from the cathode 19 to the plate 18.

The electron tubes 12 and 13 are connected by a common plate or output circuit which includes conductors 22 and 23 connected with the plates of the respective tubes and a conductor 24 connecting the cathodes 19 of the two tubes. An appropriate voltage or potential is supplied to the plate circuit from a suitable source by the conductors 25 and 26. The conductor 25 is connected with the conductor 24 of the plate circuit and the conductor 26 is connected with the conductors 22 and 23 through substantially equal sections 27 and 28 of an inductive coil 29 embodied in an inductive coupling or transformer 30. In the plate circuit as just described the portions represented by the conductors 22 and 23, and the coil sections 27 and 28 connected therewith, may also be referred to as parallel portions of the plate circuit. As shown in the drawing, heating current of the appropriate characteristics is supplied from a suitable source to the heaters 20 by the conductors 31 and 32.

As already indicated above, the electron tubes 12 and 13 are connected with the static tube 14, so as to be responsive to changes which occur in atmospheric pressure in the static tube as the result of changes made by the aircraft either to or from a level flight condition. The effect produced on one of the electron tubes, in this instance the tube 13, as the result of such changes in atmospheric pressure is retarded relative to the effect produced on the other tube so as to obtain a resultant effect which can be used in controlling or actuating the meter 10. For rendering the electron tube 12 responsive to such pressure changes occurring in the static tube 14, I provide this electron tube with a flexible diaphragm device or bellows 34 having a chamber 35 therein and such diaphragm device is sealed to or connected with the envelope 17 of the electron tube in such a manner that the chamber 35 is in open communication with the envelope through the passage 36. The diaphragm device 34 is located in an air-tight housing 37 which is connected with the static tube 14 by the conduit 15.

When the aircraft pulls out of a level flight, the atmospheric pressure in the static tube 14 increases or decreases, depending upon whether the aircraft descends or ascends. Such pressure changes or impulses are transmitted by the conduit 15 to the housing 37 where they act on the outer surface of the flexible diaphragm device 34. An increased pressure tends to collapse the device 34 and displace additional gas into the envelope 27 of the electron tube to thereby increase the gas pressure in the electron tube and produce a change in the flow of electrons from the cathode 19 to the plate 18. A decrease in pressure relieves the flexible device 34 and permits gas to flow from the envelope 17 to the chamber 35 thereby decreasing the gas pressure in the electron tube and producing a variation in the flow of electrons from the cathode to the plate.

For rendering the electron tube 13 responsive to the pressure changes occurring in the static tube 14, I also provide this electron tube with a flexible diaphragm device 34 which is connected with the static tube by the conduit 16 and is located in an air-tight housing 37. An important difference between the electron tube 13 and the electron tube 12 is that in the former a restriction 39 is provided in the passage 36 which connects the chamber 35 of the flexible device with the interior of the envelope 17. This restriction retards the flow of gas between the chamber 35 and the envelope so as to delay or retard the effect of the pressure changes on the electron tube 13 with respect to the effect produced by such changes on the electron tube 12.

Thus when the aircraft pulls out of level flight as mentioned above, an effect will be produced substantially immediately on the electron tube 12 to cause a variation in the electrical output of the plate current for this electron tube. The electron tube 13, however, will temporarily be substantially unaffected because of the restriction 39 and the electrical output or plate current for the electron tube 13 will temporarily remain substantially constant. The unequal plate currents of the two electron tubes act through the sections 27 and 28 of the coil 29 to produce a resultant effect which can be used to actuate or control the meter 10.

When the aircraft levels off, the gas pressure in the electron tube 13 changes or equalizes as the result of the flow through the restriction 39 to a condition in which the pressures in the two electron tubes 12 and 13 are substantially equal and in which the electrical output or plate currents for the two tubes are likewise substantially equal. When this occurs the plate currents for the two electron tubes neutralize each other in the coil 29 of the coupling 30 and there will be no reading given by the meter 10 at this time.

The meter 10 can be any standard or conventional electric meter, such as a galvanometer, having a movable pointer or needle 41 and up and down graduations or scales 42 and 43 with which such movable needle 41 cooperates. A pair of conductors 44 and 45 connect the meter with a coil 46 of the inductive coupling 30 and provide an energizing circuit for the meter. Although I show only one of the meters in the instrument illustrated in Fig. 1, a plurality of such meters can be located at various desired points in the aircraft and the conductors 44 and 45 can be extended to such additional meters to connect the same with the coil 46 of the inductive coupling 30.

For purposes of calibration the portion of the plate circuit for the electron tube 12 which is represented by the conductor 22, contains a variable resistance or potentiometer 48. A similar variable resistance or potentiometer 49 is located in the portion of the plate circuit for the electron tube 13 which is represented by the conductor 23. By means of these potentiometers the voltages in the parallel sections of the plate circuit, and hence the plate currents, can be varied for zeroing the meter 10 or otherwise adjusting or calibrating the apparatus for satisfactory operation.

In Fig. 2 I show a modified construction for the electron tube 13 which differs from Fig. 1 in that a restriction 50 is located in the conduit 16 at a point adjacent the housing 37 and the connecting passage 36 between the electron tube and the flexible diaphragm device 34 does not contain a restriction. The restriction 50 in the construction of Fig. 2 retards the effect of the pressure changes on the electron tube 13, and although located ahead of the flexible device 34, will accomplish substantially the same function as the restriction 39 in Fig. 1.

From the foregoing description and the accompanying drawing it will now be readily understood that I have provided a novel form of instrument with which direct indications can be obtained of the rate at which changes are taking place in the pressure of a fluid. It will be seen also that the instrument is especially suitable for use on aircraft as a rate of climb indicator.

Although I have illustrated and described my improved indicating instrument in considerable detail it will be understood, of course, that I do not wish to be correspondingly limited but regard my invention as including all changes and modifications coming within the scope of the appended claims.

Having thus described my invention, I claim:

1. An instrument of the character described comprising, an indicator, a pair of electron tubes connected with said indicator for controlling the same, each of said tubes having gas sealed therein, fluid impulse transmitting means connected with each electron tube and adapted to vary the pressure of the gas therein for rendering the tube responsive to changes in the pressure of a fluid, and means for retarding the effect of the pressure changes on one of said tubes relative to the other.

2. A rate of climb indicator for aircraft comprising, an electric meter, a pair of electron tubes connected with said meter for energizing the same, each of said tubes having gas sealed therein, fluid impulse transmitting means connected with each electron tube and adapted to vary the pressure of the gas therein for rendering the tube responsive to changes in the static pressure of the atmosphere, and means for retarding the effect of the pressure changes of the atmosphere on one of said electron tubes relative to the other.

3. An indicator of the character described comprising, an electric meter, a pair of electron tubes connected with said meter for energizing the same, each of said tubes having gas sealed therein, fluid impulse transmitting means connected with each electron tube including a diaphragm device and adapted to vary the pressure of the gas therein for rendering the tubes responsive to changes in the pressure of a fluid, and a restriction associated with one of the diaphragm devices for relatively retarding the effect of the fluid pressure changes on one of said electron tubes.

4. An instrument of the character described comprising, a plurality of electron tubes having a common output circuit, each of said electron tubes having gas sealed therein and having an envelope which includes a flexible member and the electrical output of each tube being variable in accordance with changes in the pressure of the gas therein, a fluid pressure responsive means subject to changes in the pressure of a fluid and connected with each electron tube so as to act through said flexible member for causing corresponding variations in the pressure of the gas in the electron tube, an indicator electrically connected with said common output circuit, and means for retarding the effect of the fluid pressure responsive means on one of said electron tubes relative to the effect produced on another of said electron tubes by the fluid pressure responsive means connected therewith.

5. An instrument of the character describing comprising, a plurality of electron tubes having a common output circuit, each of said electron tubes having gas sealed therein and the electrical output of each electron tube being variable in accordance with changes in the gas pressure therein, fluid pressure responsive means connected with said electron tubes so as to produce variations in the gas pressure therein, an indicator electrically connected with said output circuit, and means for relatively retarding the effect of said fluid pressure responsive means on one of said electron tubes.

6. An indicator of the character described comprising, a pair of electron tubes having a common plate circuit, said electron tubes having gas sealed therein and the electrical output of each tube being variable in accordance with changes in the gas pressure therein, a meter electrically connected with said common plate circuit, a diaphragm device connected with each tube for varying the pressure therein in accordance with changes in atmospheric pressure, and a restriction associated with one of said diaphragm devices for retarding the effect of atmospheric pressure changes on the corresponding electron tube.

7. A rate of climb indicator for aircraft having a static tube, comprising a pair of electron tubes having plate circuits connected in parallel through an inductive coil, each electron tube having gas sealed therein and the current in its plate circuit being variable with changes in the gas pressure in the electron tube, a diaphragm device connected with each electron tube and responsive to variations in pressure in said static tube for correspondingly varying the gas pressure in the electron tubes, a meter having a circuit inductively coupled with said coil, and a restriction associated with one of said diaphragm devices for relatively retarding the effect thereof on the corresponding electron tube.

ASA REN LEE.